Sept. 29, 1959  L. F. DuMORE  2,906,615
PROCESS OF MAKING FERTILIZER FROM POULTRY DROPPINGS AND FEATHERS
Filed April 16, 1956
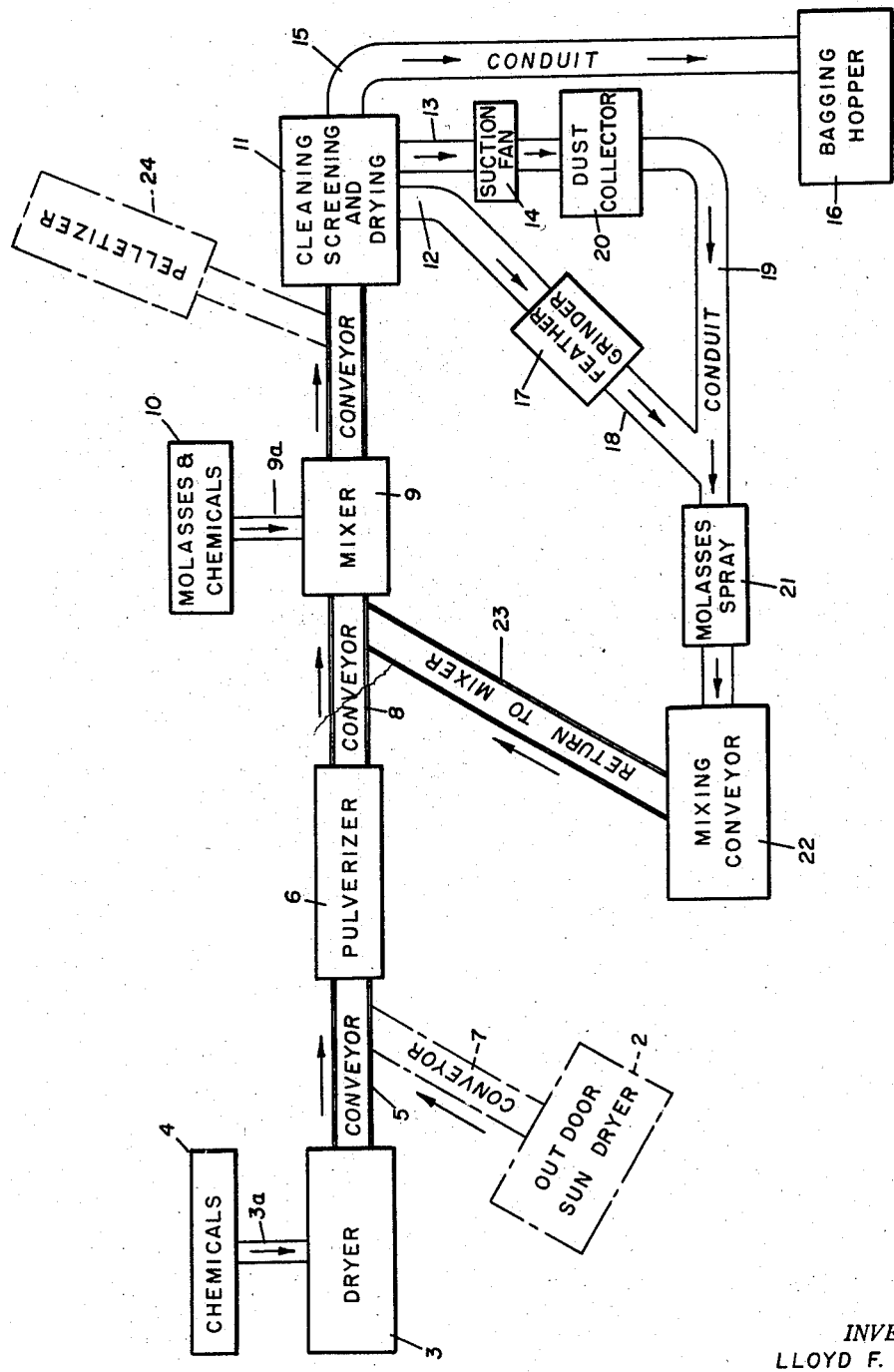
INVENTOR.
LLOYD F. DuMORE
BY
ATTORNEY 12,906,615
Patented Sept. 29, 1959

2,906,615

PROCESS OF MAKING FERTILIZER FROM
POULTRY DROPPINGS AND FEATHERS

Lloyd F. Dumore, San Diego, Calif.

Application April 16, 1956, Serial No. 578,455

3 Claims. (Cl. 71—18)

My invention relates to fertilizing products and processes for making same, particularly in relation to commercial fertilizers as prepared from poultry-manure or droppings from hens and chickens, containing the usual amount of hen or chicken moults mixed therewith, to which mixture may be added nitrogen, phosphate, potash, and a solution of molasses or other viscous syrup; the mixture being dried and pulverized, and ultimately put into bags or other containers to fit the same for horticultural as well as agricultural use in the fertilization of plant life.

An important object of my invention is, by a simple and novel treatment of poultry-manure containing poultry feathers or moults, to produce a pulverized fertilizer constituting a marketable product of superior quality from which, if desired, may be separated during the formation thereof solely for mulching purposes the feathers or moults thereof.

Another object is practically to utilize as an effective binding and enriching element for the fertilizer, a solution of molasses or other organic viscous syrup, supplied so as to thoroughly impregnate the granular or pulverized mass of the material and to be dried therein.

Another object is to provide a fertilizer in dried or comminuted form which is dry and which may be packed in bags or other convenient receptacles, kept without deterioration, and readily used in the field.

Another object is to refine the product so as to satisfy the present day requirements of parks, golf courses, gardens, and farm equipment, as to mechanical conditions, plant nutrient value, even availability of plant food and odorlessness.

Another object is to guard against hazards and losses occasioned by dust produced through comminution or pulverization in the manufacture of the product, the said dust being laid through the introduction of liquids therein forming a mixture thereof.

My invention further consists of other novel features, combinations of elements, and steps of the process, as hereinafter more particularly set forth and claimed.

As is well understood in the art, the droppings of poultry, coming from live poultry farms and other sources where poultry is raised for the market, form a prolific supply of this kind of manure as fertilizers in turf production and for other horticultural needs. In such manure, there is generally present a large amount of feathers, which in their raw state are unavailable for said needs, and, as I have discovered, require further and separate treatment in order to render the same usable as fertilizers. Thus, through a series of experiments, I have found that by separating the feathers from the bulk of this manure, by drying and comminuting or pulverizing the feathers so separated, and by subjecting the powder or mass of small particles so formed, to other treatment as in the steps of my process herein set forth, I have succeeded in producing for fertilizing purposes an important commercial product. This is because that when the feathers are so separated and treated, they render available plant foot therein contained in an assimilable form for plant production, and otherwise may serve for mulching purposes.

Reference is hereby made to the accompanying drawing, in which I have set forth schematically in the figure the sequential steps of my process, together with conventional apparatus employed therefor, and varying relations and adaptations thereof.

Starting with the raw material in the form of the droppings from poultry gathered from the farm and other sources where poultry is raised for the market, such material in quantity may be dumped and spread upon a slab 2 or other surface and exposed out-of-doors to the drying heat of the sun. Preferably, however, the said material is introduced into some form of conventional dryer 3, where the manure is dried, while there is being introduced therein, through a conduit 3a leading from a drum 4, chemical compounds of nitrogen, phosphoric acid, and potash. From the dryer 3, the material is conducted by a conventional form of conveyor 5 to the conventional pulverizer 6, where said material is comminuted into minute particles or powder. As an alternative, the manure dried upon the slab 2, in place of being dried in the dryer 3, may be conducted by a conveyor 7 to the pulverizer 6, and the chemicals, coming from the drum 4, may be introduced into conveyor 7 and mixed with said manure, while passing therethrough.

From the pulverizer 6, the chemically treated dried and comminuted material is conducted by a conventional form of conveyor 8 to the conventional mixer 9, where there is introduced through a conduit 9a leading from a drum 10 a flowing quantity of molasses or other organic viscous syrup which is thoroughly mixed with said material. To such mixture chemical compounds as above referred to may be added. The said molasses or syrup may, if desired, be diluted with water; and serves as a binding element to hold the particles of the mixer in separated granular relation.

From the mixer 9, the mixture is conveyed to the conventional drying and screening apparatus 11 where it is thoroughly dried and screened; the free feathers being removed by gravity and bagged through conduit 12, the dust being removed and discharged through conduit 13 into collector 20 by suction fan 14, and the residue being discharged through conduit 15 to the bagging hopper 16, and being one form of fertilizing product supplied to the commercial trade. The feathers so removed may be used for mulching purposes.

In order, however, as a further development of my process, that the said dust and feathers so removed may be further availed of, in whole or in part, in the final residue, I provide for the restoration of the same, after further treatment, to the mixer 9. This restoration is accomplished, by conducting the free feathers through conduit 12 to be ground in the grinder 17 and thence by conduit 18 to the conduit 19 leading from the dust collector 20 into the chamber 21, where the ground feathers and dust are sprayed with diluted molasses or other organic viscous syrup. From said chamber 21, the feathers and dust so sprayed are conducted to the mixing conveyor 22, thoroughly mixed and returned through conduit 23 to the mixer 9, where the processing of the material is continued in accordance with the steps hereinbefore set forth.

Also as a further step in my process, I provide, if desired, a conventional means 24 for pelletizing the product. This may be accomplished by apparatus, as indicated by dashed lines in Fig. 1, communicating with the conveyor leading to the cleaning, screening device 11, but may as is obvious be connected as a confluent to any other convenient and suitable portion of the passageway or conduit of the stream.

As a general result of this process, I believe myself to be the first person in the art to produce as a fertilizer a new and useful composition of matter, which is odorless, dustless, and free running, which has preserved and rendered usable fertilizing food values inherent in poultry manure heretofore unavailable or subject to loss or deterioration, as fertilizer, and which has the property, when brought into contact with the moisture of the soil, of readily disintegrating and becoming thereupon assimilable as plant food therein. This is accomplished, not only through rendering the feathers contained in poultry manure assimilable as fertilizing material, but also through the addition of organic viscous fluid acting as a binder in accomplishing agglomeration of the elements of the mass. The feathers (keratin) are rich in nitrogen, normally unusable as plant food, but when pulverized and treated chemically, and combined with other elements of my product as hereinbefore set forth immediately become assimilable and a valuable addition thereto. The bonding element consisting of a solution of molasses or other organic viscous liquid is important because bringing about for commercial purposes pelletizing or agglomeration of the particles of the product.

As forming an essential combination of elements constituting my product, in addition to poultry manure treated in accordance with my process, I employ in the processing of the same the usual commercial forms of nitrogen, phosphorus, phosphoric acid, and potassium, to which I add the solution of organic viscous liquid as aforesaid; the nitrogen being generally derived from anhydrous ammonia, solutions of nitrogen, sulphate of ammonia, ammonium nitrate, calcium cyanamid and urea; the phosphoric acid coming largely from bone meal, ground phosphate rock, superphosphate, dicalcic phosphate, ammonium phosphate and liquid phosporic acid; the potassium being mostly in the form of muriate of potash, unleached hardwood ashes, and sulphate of potash; and the viscous syrup being in the form of fluid molasses with or without dilution, or of other agglomerating binding material.

For example, for lawns and golf courses, I may use the following composition:

| | |
|---|---|
| Poultry manure (dried pulverized) | Approximately 70 pounds. |
| Nitrogen (urea) | One to thirty pounds. |
| Phosphorus (ammonium phosphate) | One to twenty pounds. |
| Potash (muriate) | One to ten pounds. |
| Molasses liquid (viscous syrup, diluted ¼ to ⅓) | Two to eight pounds. |

As a general fertilizer, for farm produce and crops, I may use:

| | |
|---|---|
| Poultry manure (dried pulverized) | Approximately 100 pounds. |
| Nitrogen (urea) | Five to seven pounds. |
| Phosphorus ammonium (phosphate) | Six to eight pounds. |
| Potash (muriate) | Three to five pounds. |
| Molasses solution (viscous syrup diluted ¼ to ⅓). | |

Also, as a general fertilizer for farming, I may use:

| | |
|---|---|
| Poultry manure (dried pulverized) | Approximately 50 pounds. |
| Nitrogen (anhydrous ammonia) | Thirty to fifty pounds. |
| Potassium (muriate of potash) | Ten to fifty pounds. |
| Phosphorus (triple superphosphate) | Twenty to fifty pounds. |
| Molasses solution (¼ to ⅓) | Eight to fifty pounds. |

Or as such farming fertilizer, I may use:

| | |
|---|---|
| Poultry manure (dried pulverized) | Approximately 50 pounds. |
| Nitrogen (anhydrous ammonia) | Fifty to 100 pounds. |
| Phosphorus (triple superphosphate) | Fifty to 100 pounds. |
| Potassium (muriate of potash) | Fifty to 100 pounds. |
| Molasses solution (¼ to ⅓) | Eight to 100 pounds. |

Generally considered, my improved product is a mixed fertilizer comprising a dry pulverized dry poultry manure, with or without feathers, mixed with nitrogen, phosphorus and potassium, singly or collectively, and bonded with agglutinizing material such as molasses in diluted form, the nitrogen, phosphorus, or potassium being derived from the various chemical commercial forms thereof now on the market and available for fertilization.

Not only has my product made available as fertilizer parts of poultry manure heretofore unassimilable as fertilizing elements thereof but I have succeeded in eliminating the caustic characteristics of such manure untreated by my process; poultry manure coming from live poultry farms in its usual raw state being often found to "burn" or injure the plant when applied thereto, and thereby tending greatly to diminish or impair its value as a food for growing plants.

By the words "pulverizing" as used in the specification and claims, I desire to be understood as referring to any well known type of crushing, pulverizing, comminuting, rolling or other apparatus, whereby the product is reduced to granular comminuted, pelletized or powdered form.

My invention may be embodied in other specific forms without departing from the spirit or essential characteristics thereof. The present embodiment as above set forth is therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In a process of preparing a dry, granular fertilizer from a mixture of raw, untreated poultry droppings including poultry feathers embedded therein and loose feathers, the steps comprising drying the mixture, introducing nitrogen, phosphoric acid and potash of fertilizer value to the mixture during the drying step, pulverizing the resultant mixture to reduce it to small particle form, adding an organic syrup and additional quantities of nitrogen, phosphoric acid and potash of fertilizer value to said mixture, said organic syrup serving as a binder to hold the particles of the mix in separated granular relation, drying and screening said mixture, and collecting the finished product for commercial use.

2. In a process of preparing a dry, granular fertilizer from raw poultry droppings from which the feathers have been removed, the steps comprising drying the droppings, adding nitrogen, phosphoric acid and potash of fertilizer value thereto, pulverizing the product so formed to reduce it to granular form, mixing therewith an organic syrup and additional quantities of nitrogen, phosphoric acid and potash of fertilizer value, said organic syrup serving as a binder to hold the particles of the mix in separated granular relation, drying and screening the thus treated mixture, and collecting the finished product for commercial use.

3. In a process of preparing a dry granular fertilizer from a mixture of raw, untreated poultry droppings including poultry feathers embedded therein and loose feathers, the steps comprising drying the mixture, introducing nitrogen, phosphoric acid and potash of fertilizer value to the mixture during the drying step, pulverizing the resultant mixture to reduce it to small particle form, adding an organic syrup and additional quantities of nitrogen, phosphoric acid and potash of fertilizer value to said mixture, drying and screening said treated mixture, recirculating to the main path of flow of the processed mixture any loose feathers still present and the dust arising from said screening operation, grinding said loose feathers to small particle form, spraying said ground feathers and entrained dust with an organic syrup, mixing the product thus formed, and returning it to the main path of flow of the processed mixture for collection and commercial use.

References Cited in the file of this patent

UNITED STATES PATENTS

| | | |
|---|---|---|
| 1,420,596 | Webster | June 20, 1922 |
| 1,718,297 | Maclachlan | June 25, 1929 |
| 1,810,239 | Doolittle | June 6, 1931 |
| 2,043,265 | Roeder | June 9, 1936 |
| 2,640,772 | Arthur | June 2, 1953 |

FOREIGN PATENTS

| | | |
|---|---|---|
| 471,067 | Great Britain | Aug. 26, 1937 |

OTHER REFERENCES

Bruttini, A., Uses of Waste Materials, published by P. S. King and Son, Ltd., London, 1923, page 233.

Chemical Engineering, "Agglomeration," October 1951, pp. 161–164, 169, 170.